United States Patent
Potgieter et al.

(10) Patent No.: US 12,224,698 B2
(45) Date of Patent: Feb. 11, 2025

(54) METHOD OF CONTROLLING A BRUSHLESS PERMANENT-MAGNET MOTOR

(71) Applicant: Dyson Technology Limited, Wiltshire (GB)

(72) Inventors: Johannes Hendrik Jacob Potgieter, Nottingham (GB); David James Evans, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 144 days.

(21) Appl. No.: 18/029,630

(22) PCT Filed: Sep. 29, 2021

(86) PCT No.: PCT/GB2021/052517
§ 371 (c)(1),
(2) Date: Mar. 30, 2023

(87) PCT Pub. No.: WO2022/074360
PCT Pub. Date: Apr. 14, 2022

(65) Prior Publication Data
US 2023/0369999 A1 Nov. 16, 2023

(30) Foreign Application Priority Data

Oct. 8, 2020 (GB) ...................... 2015946

(51) Int. Cl.
*H02P 6/26* (2016.01)
*H02P 6/06* (2006.01)
*H02P 6/22* (2006.01)

(52) U.S. Cl.
CPC .................. *H02P 6/26* (2016.02); *H02P 6/06* (2013.01); *H02P 6/22* (2013.01)

(58) Field of Classification Search
CPC ...... H02P 6/26; H02P 6/06; H02P 6/22; H02P 1/029; H02P 1/04; H02P 1/22; H02P 1/24;
(Continued)

(56) References Cited

U.S. PATENT DOCUMENTS 4,514,667 A 4/1985 Sakmann et al.
4,641,066 A 2/1987 Nagata et al.
(Continued)

FOREIGN PATENT DOCUMENTS

EP 0251785 A2 1/1988
GB 2469126 A 10/2010
(Continued)

OTHER PUBLICATIONS

International Search Report and Written Opinion received for PCT Patent Application No. PCT/GB2021/052517, mailed on Jan. 4, 2022, 10 pages.
(Continued)

*Primary Examiner* — David Luo
(74) *Attorney, Agent, or Firm* — Tucker Ellis LLP; Michael G. Craig

(57) ABSTRACT

A method of controlling a brushless permanent-magnet motor having a phase winding and a rotor, includes applying voltages of first and second opposing polarities to the phase winding when the rotor is oscillating about a parking position, measuring a plurality of first times, each first time including a time taken for current flowing through the phase winding in response to an applied voltage of the first polarity to exceed a threshold and measuring a plurality of second times, each second time including a time taken for current flowing through the phase winding in response to an applied voltage of the second polarity to exceed the threshold. The method includes determining which of an average magni- (Continued)

tude of the plurality of first times and an average magnitude of the plurality of second times has the smaller average magnitude, and determining an amplitude peak of the plurality of times having the smaller average magnitude. The method includes using the amplitude peak to calculate a time window, setting a timer corresponding to the time window at a subsequent determined amplitude peak, and applying a drive voltage to the phase winding during the time window.

14 Claims, 10 Drawing Sheets

(58) Field of Classification Search
CPC .. H02P 1/46; H02P 1/465; H02P 21/18; H02P 25/022; H02P 25/03; H02P 25/06; H02P 1/02; H02P 6/18; H02P 6/20
USPC .............................. 318/400.26, 400.01, 700
See application file for complete search history.

(56) References Cited

U.S. PATENT DOCUMENTS

| | | | |
|---|---|---|---|
| 4,764,711 A | 8/1988 | Deller | |
| 4,922,169 A | 5/1990 | Freeman | |
| 5,012,166 A | 4/1991 | Ushijima et al. | |
| 5,068,582 A | 11/1991 | Scott | |
| 5,115,174 A * | 5/1992 | Masuda | G11B 19/20 318/400.11 |
| 5,327,053 A | 7/1994 | Mann et al. | |
| 5,467,025 A | 11/1995 | Ray | |
| 5,598,071 A | 1/1997 | Dunfield et al. | |
| 5,600,218 A | 2/1997 | Holling et al. | |
| 5,608,300 A | 3/1997 | Kawabata et al. | |
| 5,696,430 A | 12/1997 | Erdman et al. | |
| 5,982,571 A | 11/1999 | Calfee et al. | |
| 6,104,153 A | 8/2000 | Codilian et al. | |
| 6,204,618 B1 | 3/2001 | Wang et al. | |
| 6,538,404 B2 | 3/2003 | Kato et al. | |
| 7,158,329 B1 | 1/2007 | Ryan | |
| 7,622,880 B1 | 11/2009 | Chui et al. | |
| 9,088,235 B2 | 7/2015 | Bateman | |
| 9,088,238 B2 | 7/2015 | Bateman | |
| 9,515,588 B2 | 12/2016 | Bateman et al. | |
| 10,784,805 B1 | 9/2020 | Bojoi et al. | |
| 2002/0033684 A1 | 3/2002 | Jensen et al. | |
| 2002/0167290 A1 | 11/2002 | Seki | |
| 2004/0257028 A1 | 12/2004 | Schulz et al. | |
| 2005/0151502 A1 | 7/2005 | Quirion | |
| 2005/0216225 A1 | 9/2005 | Anghel et al. | |
| 2005/0269982 A1 | 12/2005 | Coles et al. | |
| 2006/0132070 A1 | 6/2006 | Heydt et al. | |
| 2006/0176005 A1 | 8/2006 | Ta et al. | |
| 2006/0197478 A1 | 9/2006 | Wang et al. | |
| 2007/0194730 A1 | 8/2007 | Fukamizu et al. | |
| 2007/0296371 A1 | 12/2007 | Aoki | |
| 2010/0251512 A1 | 10/2010 | Clothier et al. | |
| 2010/0253257 A1 | 10/2010 | Clothier et al. | |
| 2010/0253262 A1 | 10/2010 | Celik | |
| 2010/0253263 A1 | 10/2010 | Clothier et al. | |
| 2010/0256782 A1 | 10/2010 | Dai | |
| 2011/0254482 A1 | 10/2011 | Dai | |
| 2011/0254488 A1 | 10/2011 | Clothier et al. | |
| 2012/0081050 A1 | 4/2012 | Dai | |
| 2012/0081064 A1 | 4/2012 | Leaver et al. | |
| 2012/0229264 A1 | 9/2012 | Company Bosch et al. | |
| 2013/0234631 A1 | 9/2013 | Bateman | |
| 2013/0234633 A1 | 9/2013 | Bateman | |
| 2013/0234640 A1 | 9/2013 | Bateman et al. | |
| 2017/0170758 A1 | 6/2017 | Bateman et al. | |
| 2023/0387838 A1 | 11/2023 | Oakham et al. | |

FOREIGN PATENT DOCUMENTS

| | | |
|---|---|---|
| GB | 2469140 A | 10/2010 |
| GB | 2484779 A | 4/2012 |
| JP | 63-148890 A | 6/1988 |
| JP | 03-226292 A | 10/1991 |
| JP | 07-177788 A | 7/1995 |
| JP | 2001-231286 A | 8/2001 |
| JP | 2007-170868 A | 7/2007 |
| JP | 2007-336641 A | 12/2007 |
| JP | 2009-124776 A | 6/2009 |
| JP | 2010-088267 A | 4/2010 |
| JP | 2011-229387 A | 11/2011 |
| JP | 2012-010477 A | 1/2012 |
| KR | 10-2017-0076864 A | 7/2017 |
| KR | 10-2019-0143241 A | 12/2019 |
| WO | 2008/003709 A1 | 1/2008 |
| WO | 2010/046266 A2 | 4/2010 |
| WO | 2013/132247 A1 | 9/2013 |
| WO | 2013/132248 A1 | 9/2013 |
| WO | 2013/132249 A1 | 9/2013 |

OTHER PUBLICATIONS

International Search Report and Written Opinion received for PCT Patent Application No. PCT/GB2013/050547, mailed on Aug. 27, 2013, 9 pages.
International Search Report and Written Opinion received for PCT Patent Application No. PCT/GB2013/050548, mailed on Aug. 27, 2013, 8 pages.
International Search Report and Written Opinion received for PCT Patent Application No. PCT/GB2013/050549, mailed on Aug. 27, 2013, 11 pages.
International Search Report and Written Opinion received for PCT Patent Application No. PCT/GB2021/052518, mailed on Jan. 13, 2022, 12 pages.
Search Report dated Aug. 19, 2013, directed to GB Application No. 1304017.5; 1 page.
Search Report dated Jul. 3, 2012, directed to GB Application No. 1203913.7; 1 page.
Search Report dated Jun. 28, 2012, directed to GB Application No. 1203911.1; 1 page.
Search Report dated Oct. 15, 2012, directed to GB Application No. 1210372.7; 1 page.
Search Report received for GB Application No. 2015946.3, mailed on Mar. 31, 2021, 1 page.
Search Report received for GB Application No. 2015947.1, mailed on Apr. 1, 2021, 1 page.

* cited by examiner

| Control Signals | | | | Power Switches | | | | Inverter Condition |
|---|---|---|---|---|---|---|---|---|
| S1 | S2 | S3 | S4 | Q1 | Q2 | Q3 | Q4 | |
| 0 | 0 | 0 | 0 | 0 | 0 | 0 | 0 | Off |
| 1 | 0 | 0 | 1 | 1 | 0 | 0 | 1 | Excite Left-to-right |
| 0 | 1 | 1 | 0 | 0 | 1 | 1 | 0 | Excite Right-to-left |
| 0 | 1 | 0 | 1 | 0 | 1 | 0 | 1 | Body Freewheel |
| 0 | 0 | 0 | 1 | 0 | 0 | 0 | 1 | Diode Freewheel Left-to-right |
| 0 | 1 | 0 | 0 | 0 | 1 | 0 | 0 | Diode Freewheel Right-to-left |

FIG. 3

METHOD OF CONTROLLING A BRUSHLESS PERMANENT-MAGNET MOTOR

CROSS-REFERENCE TO PRIOR APPLICATION

This application is a § 371 National Stage Application of PCT International Application No. PCT/GB2021/052517 filed Sep. 29, 2021, which claims the priority of United Kingdom Application No. 2015946.3, filed Oct. 8, 2020, each of which are herein incorporated by reference in their entirety.

FIELD OF THE INVENTION

The present invention relates to a method of controlling a brushless permanent-magnet motor.

BACKGROUND OF THE INVENTION

In some cases where a brushless permanent-magnet motor has been shut-down, i.e. turned-off during operation, it may be desirable to re-start the motor before the rotor is stationary at its parking position, for example where the rotor is still oscillating about the parking position. Knowledge of the parking position may be important so that the appropriate polarity of voltage may be applied to a phase winding to re-start the motor, and knowledge of the rotor position relative to the parking position may be important to determine when to apply a voltage to the phase-winding to re-start the motor. In known brushless-permanent magnet motors it is not possible to detect the parking position and the rotor position relative to the parking position when the rotor is oscillating without a physical rotor position sensor. This means that the motor may not be able to safely re-start in a forward direction until the rotor is stationary, which may cause delays to a user of a product comprising the brushless permanent magnet motor that are considered unacceptable.

SUMMARY OF THE INVENTION

According to a first aspect of the present invention there is provided a method of controlling a brushless permanent-magnet motor having a phase winding and a rotor, the method comprising: applying voltages of first and second opposing polarities to the phase winding when the rotor is oscillating about a parking position; measuring a plurality of first times, each first time comprising a time taken for current flowing through the phase winding in response to an applied voltage of the first polarity to exceed a threshold; measuring a plurality of second times, each second time comprising a time taken for current flowing through the phase winding in response to an applied voltage of the second polarity to exceed the threshold; determining which of an average magnitude of the plurality of first times and an average magnitude of the plurality of second times has the smaller average magnitude; determining an amplitude peak of the plurality of times having the smaller average magnitude; using the amplitude peak to calculate a time window; setting a timer corresponding to the time window at a subsequent determined amplitude peak; and applying a drive voltage to the phase winding during the time window.

Brushless permanent-magnet motors typically have saliency, usually provided by an asymmetric stator tooth design, to enable the motor to always start from stationary in a forward direction. Such saliency leads to the flux linkage into the motor winding being asymmetric about a parking position of the rotor, for example with the peak flux linkage offset from the parking position of the rotor. The inventors of the present application have found that by applying voltages of opposing polarities to a phase winding of the motor during oscillation of the rotor about a parking position, the magnitudes of current rise times in the phase winding vary depending on whether a positive voltage or a negative voltage is applied to the phase winding, and depending on the parking position about which the rotor is oscillating, in view of the asymmetric flux linkage about the parking position.

In particular, current rise times corresponding to applied voltages having the same polarity as the parking position about which the rotor is oscillating have a larger average magnitude than current rise times corresponding to applied voltages having a polarity opposite to the polarity of the parking position about which the rotor is oscillating. Furthermore, the inventors of the present application have recognised that, due to the asymmetry in flux linkage either side of the parking position, caused by the motor saliency, current rise times of smaller average magnitude, i.e. current rise times corresponding to applied voltages having a polarity opposite to the polarity of the parking position about which the rotor is oscillating, have different peak values which occur at the boundaries of the rotor oscillation, i.e. at points of the oscillation furthest from the parking position. By determining amplitude peaks of current rise time corresponding to applied voltages having a polarity opposite to the polarity of the parking position about which the rotor is oscillating, a direction of motion of the rotor relative to the parking position may be inferred, and by using the amplitude peaks a time window can be calculated within which it is considered that an applied drive voltage will drive the rotor in a forward, rather than a backward, direction.

By inferring the direction of the rotor in such a manner and determining when an applied voltage will drive the rotor in a forward, rather than a backward, direction, the motor may be re-started during oscillation, which may reduce a delay of re-start compared to, for example, a motor where it is required to wait until the rotor is considered to be stationary for re-start to occur.

The method may comprise a sensorless method of controlling a brushless permanent-magnet motor, for example a method of controlling a brushless permanent-magnet motor that does not comprise a position sensor.

Applying voltages of first and second polarities to the phase winding when the rotor is oscillating about a parking position may comprise applying a voltage of a first polarity to the phase winding, subsequently applying a voltage of a second polarity to the phase winding, subsequently applying a voltage of the first polarity to the phase winding, subsequently applying a voltage of the second polarity to the phase winding, and so on. Thus the application of voltages of first and second polarities may be considered a sequential application of voltages of first and second polarities.

Each measured first time may correspond to a single application of a voltage of the first polarity. Each measured second time may correspond to a single application of a voltage of the second polarity.

Voltages of the first and second polarities may be applied to the phase winding at a frequency greater than a frequency of oscillation of the motor.

The time window may comprise a time window when the motor can be started in a forward direction with minimal risk of being started in a backward direction. Applying a drive voltage to the phase winding during the time window may comprise applying a drive voltage to the phase winding to drive the motor in a forward direction, for example to bring the rotor out of oscillation. The time window may correspond to a rotor positional range when the motor can be started in a forward direction with minimal risk of being started in a backward direction.

The method may comprise determining a low amplitude peak of the plurality of times having the smaller average magnitude, and using the low amplitude peak to calculate the time window. The method may comprise determining two sequential low amplitude peaks of the plurality of times having the smaller average magnitude, and using the two sequential low amplitude peaks to calculate the time window. A low amplitude peak may be indicative of a rotor position at a boundary of oscillation about the parking position that corresponds to a maxima of oscillation of the rotor in a backward direction.

The method may comprise determining a high amplitude peak of the plurality of times having the smaller average magnitude, and using the high amplitude peak to calculate the time window. The method may comprise determining two sequential high amplitude peaks of the plurality of times having the smaller average magnitude, and using the two sequential high amplitude peaks to calculate the time window. A high amplitude peak may be indicative of a rotor position at a boundary of oscillation about the parking position that corresponds to a maxima of oscillation of the rotor in a forward direction.

The method may comprise determining a consecutive low amplitude peak and high amplitude peak of the plurality of times having the smaller average magnitude, and using a time difference between the consecutive low amplitude peak and high amplitude peak to calculate the time window. The method may comprise determining two consecutive low amplitude peak and high amplitude peak pairs of the plurality of times having the smaller average magnitude, and using the two consecutive low and high amplitude peak pairs to calculate the time window. A low amplitude peak may be indicative of a rotor position at a boundary of oscillation about the parking position that corresponds to a maxima of oscillation of the rotor in a backward direction, whilst a high amplitude peak may be indicative of a rotor position at a boundary of oscillation about the parking position that corresponds to a maxima of oscillation of the rotor in a forward direction. Thus a low amplitude peak followed by a next high amplitude peak may be indicative of motion of the rotor from a maxima of oscillation of the rotor in a backward direction to a maxima of oscillation of the rotor in a forward direction, and the time period between a low amplitude peak followed by a next high amplitude peak may be indicative of a time taken for the rotor to move from maxima of oscillation of the rotor in a backward direction to a maxima of oscillation of the rotor in a forward direction. Such a time period may thereby be indicative of a time window during which it is considered that a voltage of appropriate polarity applied to the phase winding will start motion of the rotor in a forward direction, i.e. to bring the rotor out of oscillation.

The drive voltage may be applied to the phase winding at a halfway point of the time window. A halfway point of the time window may comprise a point in time corresponding to the parking position, and, for example, application of a voltage of appropriate polarity to the phase winding at such a point in time may start motion of the rotor in a forward direction, i.e. to bring the rotor out of oscillation.

The method may comprise removing the first or second polarity voltage from the phase winding in response to current flowing through the phase winding exceeding the threshold, and waiting for the current flowing through the phase winding to reach zero before applying a next second or first polarity voltage to the phase winding. This may ensure accuracy of measurement of the plurality of first and second times.

The method may comprise actively bringing the current flowing through the phase winding to zero when the current flowing through the phase winding exceeds the threshold. This may reduce a time taken to perform the method compared to, for example, a corresponding method where a passive waiting period is employed during which the current flowing through the phase winding falls to zero.

The method may comprise determining that the rotor is oscillating about a first parking position where the average magnitude of the plurality of first times is greater than the average magnitude of the plurality of second times, or a second parking position different to the first parking position where the average magnitude of the plurality of second times is greater than the average magnitude of the plurality of first times. Such determination of the parking position about which the rotor is oscillating may occur prior to monitoring the plurality of times having the smaller average magnitude.

When a voltage is applied to the phase winding, a stator field is generated. As the phase current increases, the density of the stator flux increases and eventually begins to saturate. As the stator saturates, the inductance of the phase winding decreases and thus the phase current increases at a faster rate. Depending on the polarity of the applied voltage and the parking position about which the rotor is oscillating, the rotor flux will either align with or oppose the stator flux. When the rotor flux is aligned with the stator flux, saturation occurs more quickly and thus the phase current increases at a faster rate. Conversely, when the rotor flux opposes the stator flux, saturation occurs more slowly and thus the phase current increases at a slower rate.

The present invention makes use of this behaviour to determine the parking position about which the rotor is oscillating. In particular, a first voltage is applied to the phase winding and the first time is measured. A second voltage is then applied to the phase winding and the second time is measured. This is repeated in a sequential manner. Since the second voltages have the opposite polarity to the first voltages, the rotor flux will be aligned with the stator flux during one of the two measurements, and the rotor flux will oppose the stator flux during the other of the two measurements. The first times will therefore be less than or greater than the second times depending on the parking position of the rotor. The present invention is therefore able to determine the parking position about which the rotor is oscillating by monitoring and comparing the average current rise times for the different applied voltages.

Knowledge of the parking position of the rotor may enable determination of the correct polarity of drive voltage to apply to the phase winding to drive the rotor in a forward direction.

The method may comprise determining a voltage polarity of the drive voltage to be applied to the phase winding based on the determined first or second parking position.

The drive voltage applied to the phase winding during the time window may comprise a polarity corresponding to the polarity of the voltage applied during the plurality of time periods having the larger average magnitude.

A larger average magnitude for the plurality of first times may indicate that the rotor is oscillating about a parking position having a polarity corresponding to the first polarity of applied voltage. A larger average magnitude for the plurality of second times may indicate that the rotor is oscillating about a parking position having a polarity corresponding to the second polarity of applied voltage. The first polarity may comprise a positive polarity, and the second polarity may comprise a negative polarity. A larger average magnitude for the plurality of first times may indicate that the rotor is oscillating about a positive parking position, and a larger average magnitude for the plurality of second times may indicate that the rotor is oscillating about a negative parking position.

The method may comprise applying a drive voltage of the first polarity where the rotor is oscillating about a parking position having a polarity corresponding to the first polarity of applied voltage during sequential application of voltages. The method may comprise applying a drive voltage of the second polarity where the rotor is oscillating about a parking position having a polarity corresponding to the second polarity of applied voltage during sequential application of voltages.

According to a second aspect of the present invention there is provided a brushless permanent-magnet motor comprising a stator, a phase winding wound about the stator, a rotor rotatable relative to the stator, and a control system to perform a method according to the first aspect of the present invention.

The control system may comprise an inverter, a gate driver module, a controller, and a current sensor, the inverter is coupled to the phase winding, the gate driver module to drive opening and closing of switches of the inverter in response to control signals output by the controller, and the current sensor to output a signal that provides a measure of the current in the phase winding.

According to a third aspect of the present invention there is provided a floorcare device comprising a brushless permanent-magnet motor according to the second aspect of the present invention.

According to a fourth aspect of the present invention there is provided a haircare appliance comprising a brushless permanent-magnet motor according to the second aspect of the present invention.

According to a fifth aspect of the present invention there is provided a method of controlling a brushless permanent-magnet motor having a phase winding and a rotor, the method comprising: applying voltages of first and second opposing polarities to the phase winding when the rotor is oscillating about a parking position; measuring a plurality of first times, each first time comprising a time taken for current flowing through the phase winding in response to an applied voltage of the first polarity to exceed a threshold; measuring a plurality of second times, each second time comprising a time taken for current flowing through the phase winding in response to an applied voltage of the second polarity to exceed the threshold; determining which of an average magnitude of the plurality of first times and an average magnitude of the plurality of second times has the smaller average magnitude; determining that the rotor is oscillating about a first parking position where the average magnitude of the plurality of first times is greater than the average magnitude of the plurality of second times, or a second parking position where the average magnitude of the plurality of second times is greater than the average magnitude of the plurality of first times; determining a voltage polarity of a drive voltage to be applied to the phase winding based on the determined first or second parking position; and (i) where the rotor is oscillating about the first parking position, determining an amplitude peak of the plurality of second times, using the amplitude peak of the plurality of second times to calculate a time window, setting a timer corresponding to the time window at a next determined amplitude peak, and applying a determined polarity drive voltage to the phase winding during the time window; and (ii) where the rotor is oscillating about the second parking position different to the first parking position, determining an amplitude peak of the plurality of first times, using the amplitude peak of the plurality of first times to calculate a time window, setting a timer corresponding to the time window at a next determined amplitude peak, and applying a drive voltage having the determined polarity to the phase winding during the time window.

Optional features of aspects of the present invention may be equally applied to other aspects of the present invention, where appropriate.

BRIEF DESCRIPTION OF THE DRAWINGS

FIG. 3 is a table indicating switching states of the motor system of FIGS. 1 and 2;

DETAILED DESCRIPTION OF THE INVENTION

Figure 1:
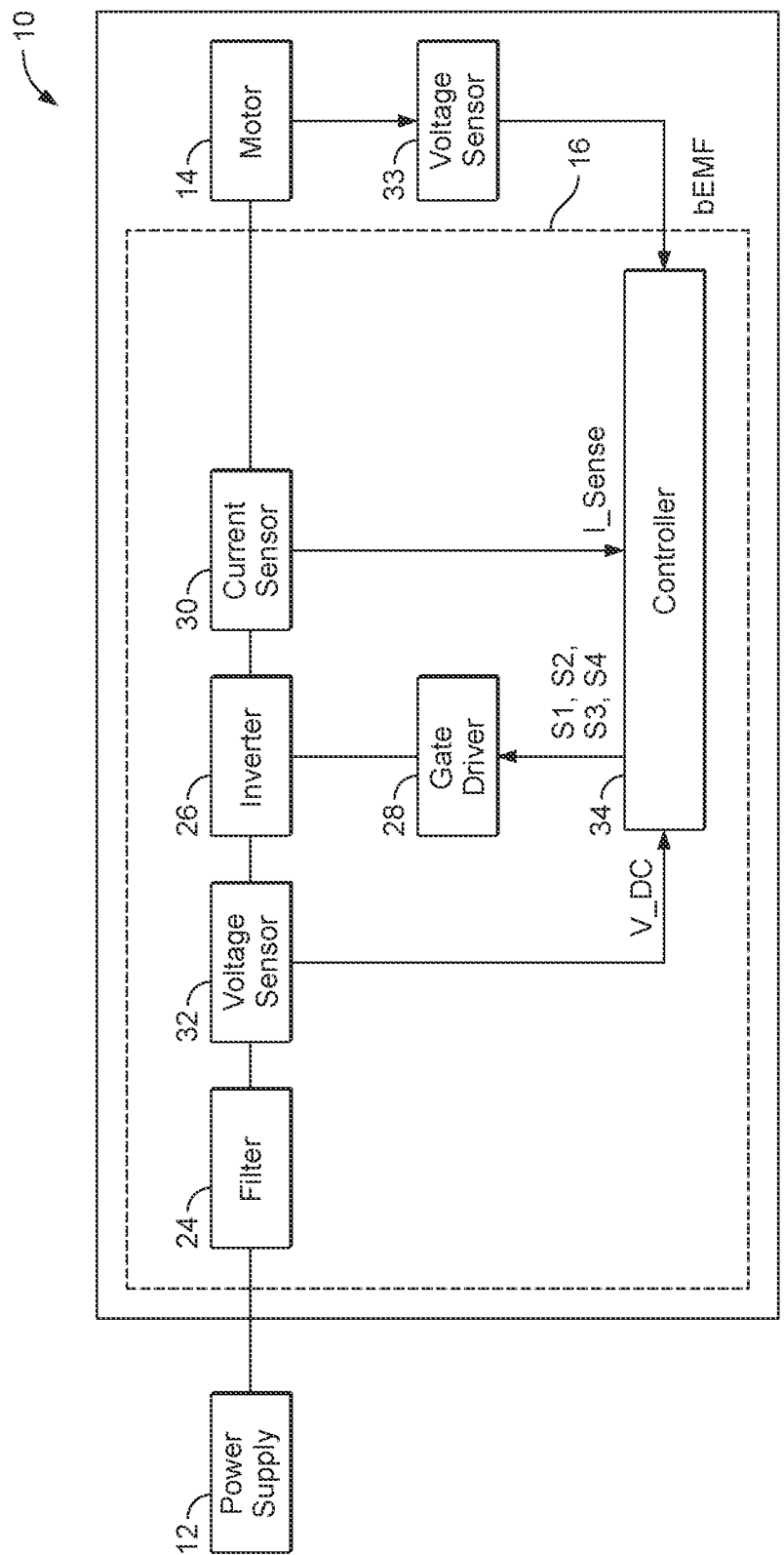
FIG. 1 is a first schematic view illustrating a motor system.
Figure 2:
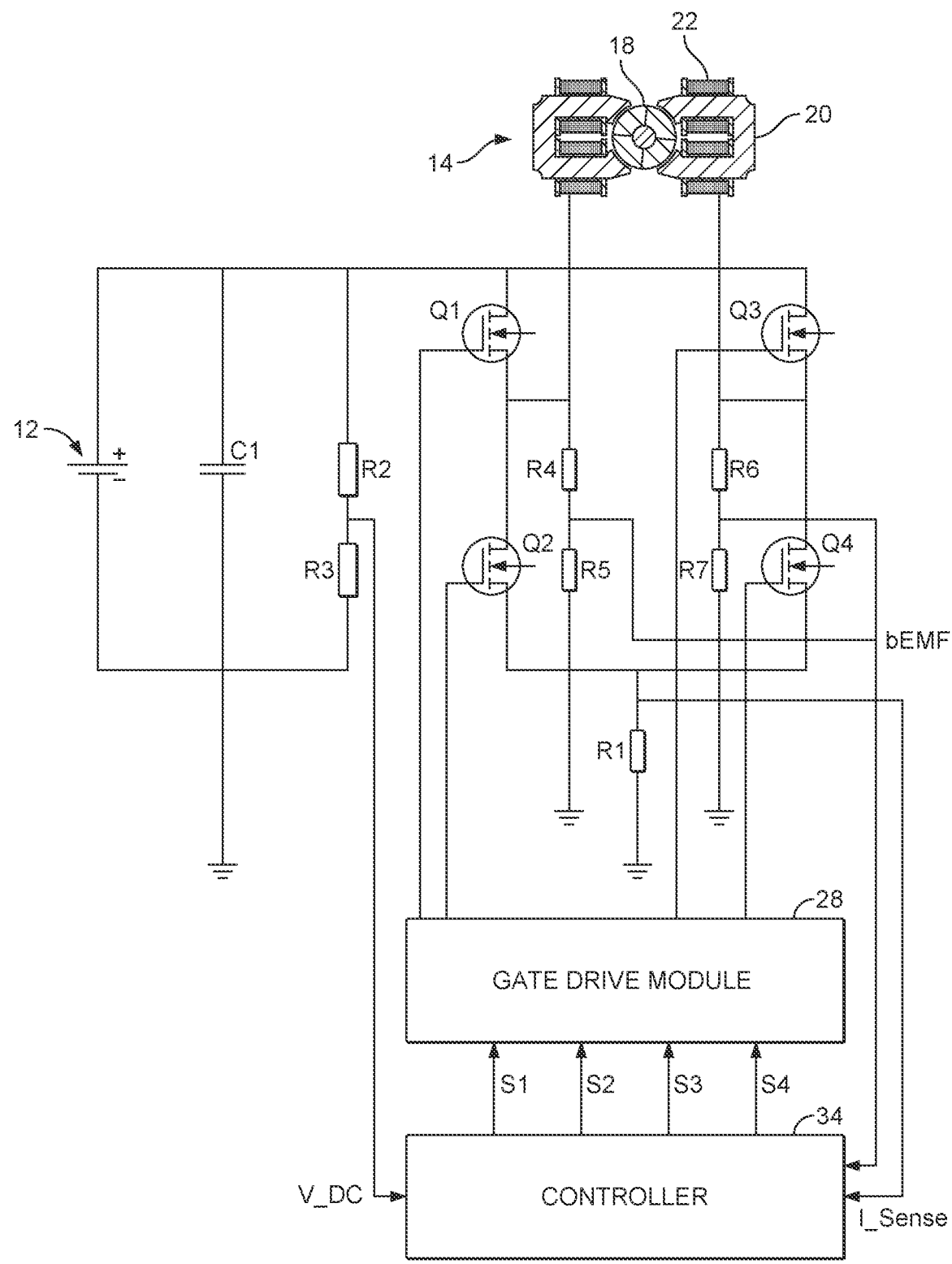
FIG. 2 is a second schematic view illustrating a motor system.

A motor system, generally designated 10, is shown in FIGS. 1 and 2. The motor system 10 is powered by a DC power supply 12, for example a battery, and comprises a brushless permanent magnet motor 14 and a control circuit 16. It will be recognised by a person skilled in the art that the methods of the present invention may be equally applicable to a motor system powered by an AC power supply, with appropriate modification of the circuitry, for example to include a rectifier.

The motor 14 comprises a four-pole permanent-magnet rotor 18 that rotates relative to a four-pole stator 20. Although shown here as a four-pole permanent magnet rotor, it will be appreciated that the present invention may be applicable to motors having differing numbers of poles, for example eight poles. Conductive wires wound about the stator 20 are coupled together to form a single-phase winding 22. Whilst described here as a single-phase motor, it will be recognised by a person skilled in the art that the teachings of the present application may also be applicable to multi-phase, for example three-phase, motors.

The control circuit 16 comprises a filter 24, an inverter 26, a gate driver module 28, a current sensor 30, a first voltage sensor 32, a second voltage sensor 33, and a controller 34.

The filter 24 comprises a link capacitor C1 that smooths the relatively high-frequency ripple that arises from switching of the inverter 26.

The inverter 26 comprises a full bridge of four power switches Q1-Q4 that couple the phase winding 22 to the voltage rails. Each of the switches Q1-Q4 includes a free-wheel diode.

The gate driver module 28 drives the opening and closing of the switches Q1-Q4 in response to control signals received from the controller 34.

The current sensor 30 comprises a shunt resistor R1 located between the inverter and the zero-volt rail. The voltage across the current sensor 30 provides a measure of the current in the phase winding 22 when connected to the power supply 12. The voltage across the current sensor 30 is output to the controller 33 as signal, I_SENSE. It will be recognised that in this embodiment it is not possible to measure current in the phase winding 22 during freewheeling, but that alternative embodiments where this is possible, for example via the use of a plurality of shunt resistors, are also envisaged.

The first voltage sensor 32 comprises a voltage divider in the form of resistors R2 and R3, located between the DC voltage rail and the zero-volt rail. The voltage sensor outputs a signal, V_DC, to the controller 34 that represents a scaled-down measure of the supply voltage provided by the power supply 12.

The second voltage sensor 33 comprises a pair of voltage dividers constituted by resistors R4, R5, R6, and R7, that are connected either side of the phase winding 22. The second voltage sensor 33 provides a signal indicative of back EMF induced in the phase winding 22 to the controller, as bEMF.

The controller 34 comprises a microcontroller having a processor, a memory device, and a plurality of peripherals (e.g. ADC, comparators, timers etc.). In an alternative embodiment, the controller 34 may comprise a state machine. The memory device stores instructions for execution by the processor, as well as control parameters that are employed by the processor during operation. The controller 34 is responsible for controlling the operation of the motor 14 and generates four control signals S1-S4 for controlling each of the four power switches Q1-Q4. The control signals are output to the gate driver module 28, which in response drives the opening and closing of the switches Q1-Q4.

During normal operation, the controller 34 estimates the position of the rotor 18 using a sensorless control scheme, i.e. without the use of a Hall sensor or the like, by using software to estimate a waveform indicative of back EMF induced in the phase winding 22 via the signals V_DC and I_SENSE. The details of such a control scheme will not be described here for the sake of brevity, but can be found, for example, in GB patent application no. 1904290.2. Another sensorless control scheme that utilises hardware components to estimate back EMF induced in the phase winding 22 is disclosed in published PCT patent application WO2013132247A1. With knowledge of the position of the rotor 18 in normal operation, the controller 34 generates the control signals S1-S4.

FIG. 3 summarises the allowed states of the switches Q1-Q4 in response to the control signals S1-S4 output by the controller 33. Hereafter, the terms 'set and 'clear' will be used to indicate that a signal has been pulled logically high and low respectively. As can be seen from FIG. 3, the controller 34 sets S1 and S4, and clears S2 and S3 in order to excite the phase winding 22 from left to right. Conversely, the controller 34 sets S2 and S3, and clears S1 and S4 in order to excite the phase winding 22 from right to left. The controller 34 clears S1 and S3, and sets S2 and S4 in order to freewheel the phase winding 22. Freewheeling enables current in the phase winding 22 to re-circulate around the low-side loop of the inverter 26. In the present embodiment, the power switches Q1-Q4 are capable of conducting in both directions. Accordingly, the controller 34 closes both low-side switches Q2, Q4 during freewheeling such that current flows through the switches Q2, Q4 rather than the less efficient diodes.

Conceivably, the inverter 26 may comprise power switches that conduct in a single direction only. In this instance, the controller 34 would clear S1, S2 and S3, and set S4 so as to freewheel the phase winding 22 from left to right. The controller 34 would then clear S1, S3 and S4, and set S2 in order to freewheel the phase winding 22 from right to left. Current in the low-side loop of the inverter 26 then flows down through the closed low-side switch (e.g. Q4) and up through the diode of the open low-side switch (e.g. Q2).

Appropriate control of the switches Q1-Q4 can be used to drive the rotor 18 at speeds up to or in excess of 100 krpm during normal operation, for example in a steady-state mode.

Figure 4:
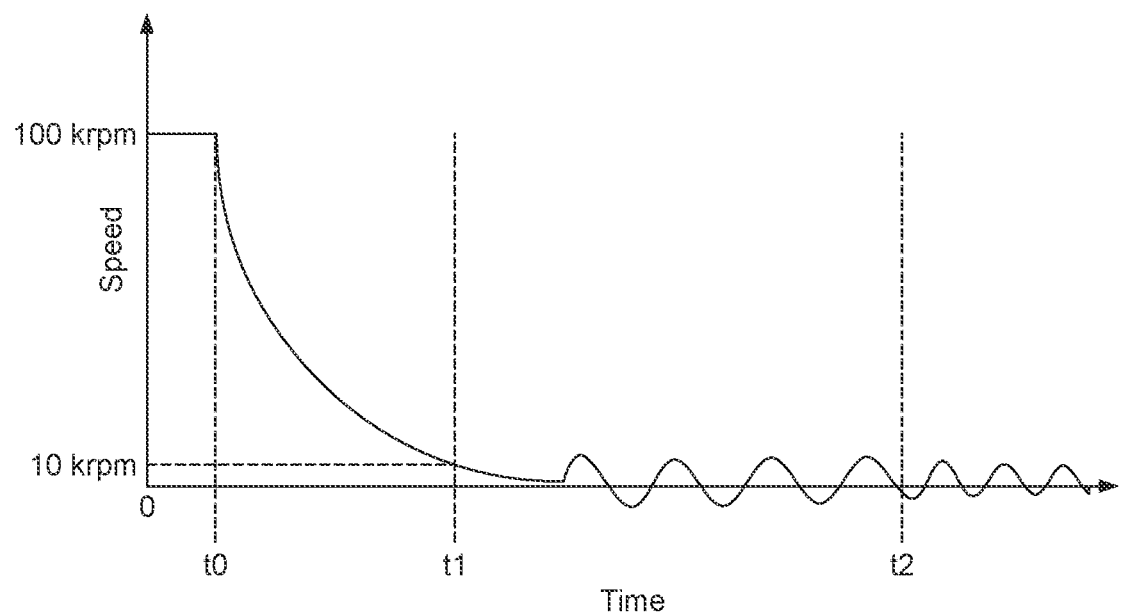
FIG. 4 is a graph illustrating a known shutdown sequence of the motor system of FIGS. 1 and 2.

A shutdown sequence of the motor 14 is illustrated in FIG. 4. Before time t0, the motor is operating in steady-state mode at a speed of around 100 krpm. The shutdown sequence is initiated at time t0, and between time t0 and t1 active braking is applied to the motor, for example by applying appropriate voltages to selected ones of switches Q1-Q4. This causes the motor to decelerate. During the time period t0-t1, the position of the rotor 18 can be monitored. In particular, the signal bEMF from the voltage sensor 33 is periodically monitored by turning switches Q1-Q4 off, and when the voltage transitions from negative to positive or positive to negative a phase voltage zero-crossing is deemed to occur. This allows the motor 14 to be re-started, if needed, during the time period t041. The time period t0-t1 may be around 150-300 ms.

At time t1 the speed of the rotor 18 has dropped to around 10 krpm. Between time t1 and t2, the rotor 18 begins to oscillate about a parking position of the rotor 18. During oscillation it may not be possible to determine a zero-crossing, and hence the position of the rotor 18 is unknown, and the motor 14 cannot be restarted as there is a risk that, without knowledge of the rotor position, an attempted restart may result in the rotor 18 spinning backwards. After time t2, the oscillations are considered small enough that the motor 14 can be safely restarted in the forward direction.

The time period between t1 and t2 may typically be in the region of 200-500 ms. Whilst this period can be reduced, for example by utilising freewheeling of the switches Q2 and, Q4 to damp oscillation, the time period in which the motor 14 cannot be restarted may still be perceptible to a user. Such a delay may give the user a false impression of failure of the product in which the motor 14 is housed, and hence may be undesirable.

The inventors of the present application have determined a way to monitor position of the rotor 18 during oscillation such that the motor 14 can be restarted with minimal delay during a shutdown procedure, i.e. during oscillation of the rotor 18 about the parking position.

Figure 5:
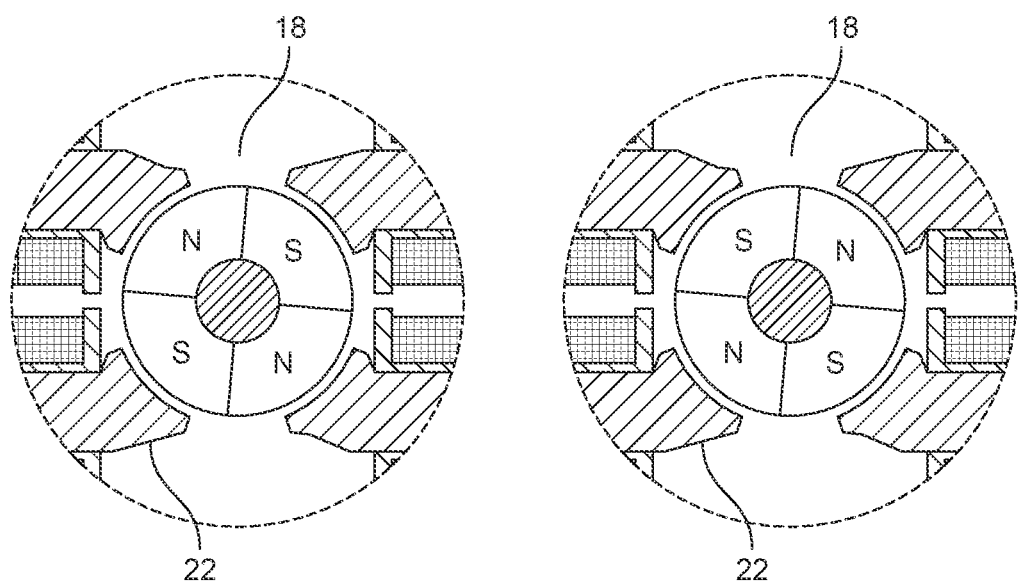
FIG. 5 is a schematic illustration of parking positions of a rotor of the motor system of FIGS. 1 and 2.

The motor 14 is provided with saliency to ensure that the rotor 18 parks in a known position that will enable the rotor 18 to be restarted in a forward direction from stationary. Such saliency is typically provided in the form of an asymmetric stator tooth design, as seen in FIG. 5, which also illustrates the rotor 18 parked in one of two positions, which can be considered positive and negative parking positions. Although referred to as two parking positions, it will be appreciated that the rotor 18 has four parking positions, but that the four parking positions can be thought of as two parking positions in view of the rotational symmetry of the rotor 18.

Knowledge of which parking position the rotor 18 is oscillating about enables a determination of the correct polarity voltage to be applied in order to re-start the rotor 18 in a forward direction.

Figure 6:
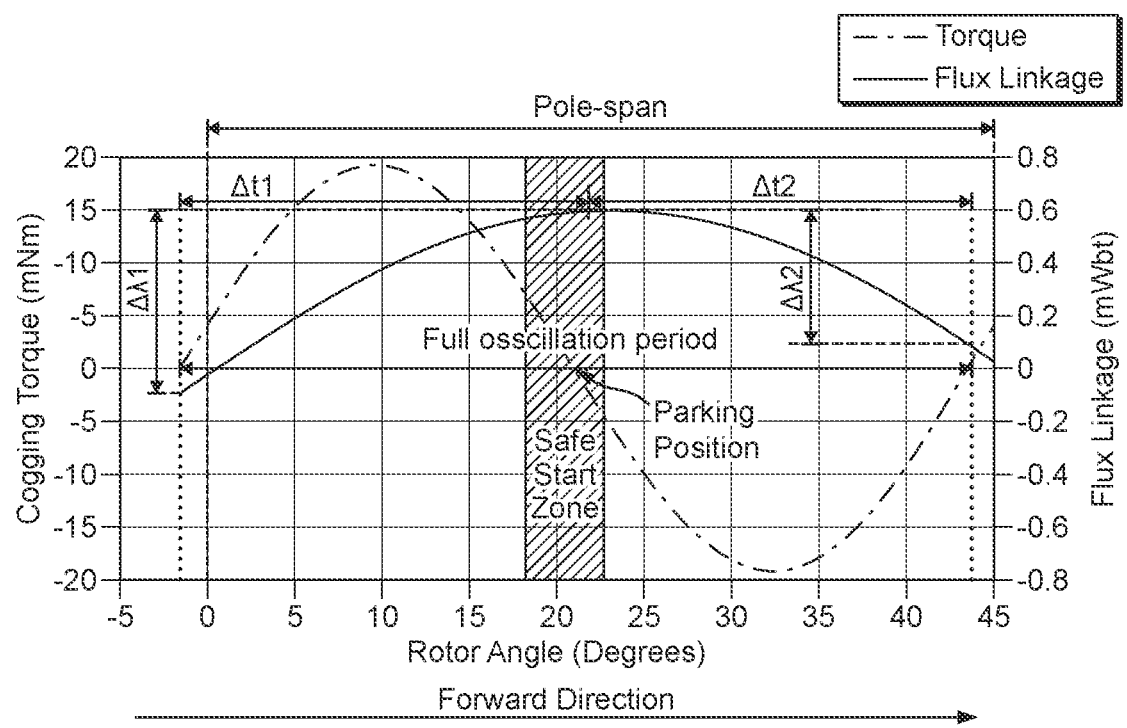
FIG. 6 is a graph illustrating variation of flux linkage about a parking position of the rotor of the motor system of FIGS. 1 and 2.

In view of the salient stator design, irrespective of whether the parking position of the rotor 18 is a positive parking position or a negative parking position, the flux linkage into the phase winding 22 from the rotor 18 is asymmetric about the parking position, as can be seen in FIG. 6, during a period of oscillation about the parking position. This asymmetry in flux linkage can be utilised in the manner described below to determine a parking position about which the rotor 18 oscillates.

During oscillation, the controller 34 sets S1 and S4 in order to excite the phase winding 22 from left to right, i.e. to apply a positive voltage to the phase winding 22. At the same time as setting S1 and S4, the controller 34 starts an internal timer. The applied positive voltage causes current in the phase winding 22 to increase. The controller 34 monitors the magnitude of the current via the signal I_SENSE, and once the current hits a pre-determined threshold, the controller 34 clears S1 and S4 and stops the internal timer. The value of the internal timer corresponds to the time taken for the phase current to increase from zero to the threshold. The controller 34 stores the timer value as a first interval and resets the timer. When S1 and S4 are cleared, the switches Q1-Q4 are off, which causes current in the phase winding 22 to decay to zero. It will be appreciated that as well as a bridge-off condition, S2 and S4 could be set to allow the current delay by freewheeling through the switches Q2 and Q4, but that a bridge-off condition may bring the current to zero more quickly, allowing positive and negative voltage applications at a higher frequency.

Once current in the phase winding 22 has decayed to zero, the controller sets S2 and S3 in order to excite the phase winding 22 from right to left, i.e. to apply a negative voltage to the phase winding 22. The applied negative voltage has the same magnitude as the applied positive voltage. At the same time as setting S2 and S3, the controller 34 starts the internal timer. The applied negative voltage causes current in the phase winding 22 to increase. The controller 34 monitors the magnitude of the current via the signal I_SENSE, and once the current hits a pre-determined threshold, the controller 34 clears S2 and S3 and stops the internal timer. The value of the internal timer corresponds to the time taken for the phase current to increase from zero to the threshold. The controller 34 stores the timer value as a second interval and resets the timer. When S2 and S3 are cleared, the switches Q1-Q4 are off, which causes current in the phase winding 22 to decay to zero.

Figure 7:
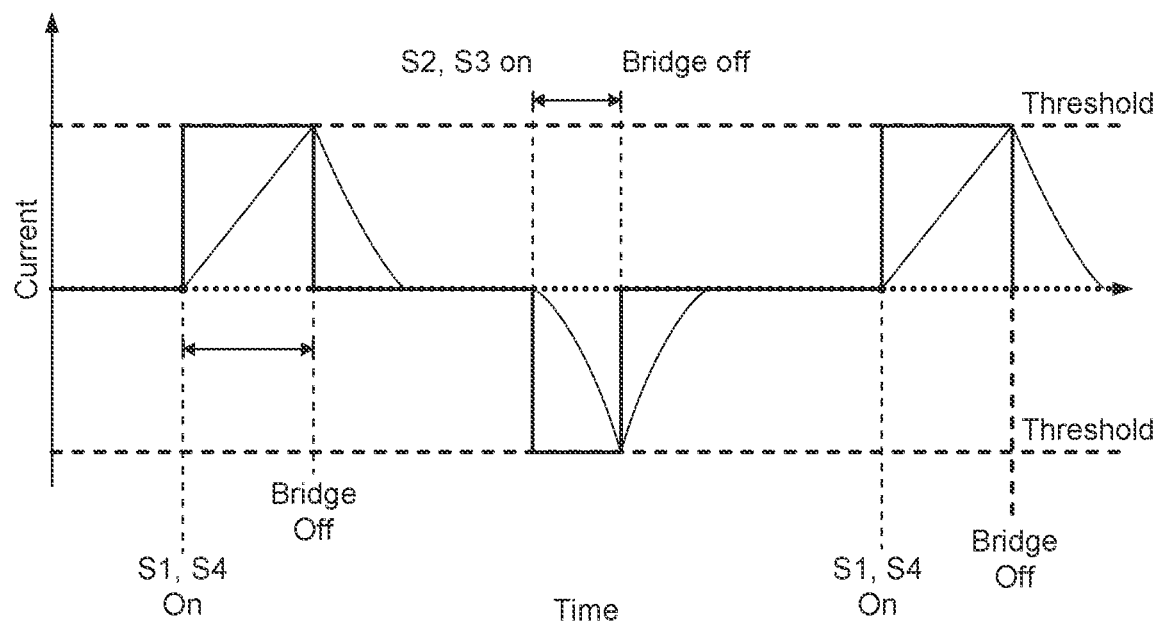
FIG. 7 is a diagram illustrating voltages applied to a phase winding of the motor system of FIGS. 1 and 2 during oscillation.

The application of voltages and corresponding current rise times are illustrated schematically in FIG. 7.

The positive and negative voltages are applied sequentially in the manner described above, i.e. with a negative applied voltage following a positive applied voltage, and a positive applied voltage following a negative applied voltage. The voltages are applied at a frequency greater than a frequency of oscillation of the rotor 18, such that multiple applied voltage instances occur per oscillation cycle of the rotor 18. Each time a voltage is applied, the controller 34 uses the internal timer to record the time taken for current flowing through the phase winding 22 to reach the threshold. Collectively, the times corresponding to the positive applied voltages can be thought of as a plurality of first times, and the times corresponding to the negative applied voltages can be thought of as a plurality of second times.

The controller 34 averages the plurality of first times and the plurality of second times, and compares the averages. The plurality of times having the larger average magnitude is indicative of the parking position of the rotor 18, with a larger average rise time for positive applied voltages indicating a positive parking position, and a larger average rise time for negative applied voltages indicating a negative parking position.

In particular, when a voltage is applied to the phase winding 22, a stator field is generated. As the phase current increases, the density of the stator flux increases and eventually begins to saturate. As the stator saturates, the inductance of the phase winding 22 decreases and thus the phase current increases at a faster rate. Depending on the polarity of the applied voltage and the parking position about which the rotor 18 is oscillating, the rotor flux will either align with or oppose the stator flux. When the rotor flux is aligned with the stator flux, saturation occurs more quickly and thus the phase current increases at a faster rate. Conversely, when the rotor flux opposes the stator flux, saturation occurs more slowly and thus the phase current increases at a slower rate.

The present invention makes use of this behaviour to determine the parking position about which the rotor 18 is oscillating. The rotor flux will be aligned with the stator flux during one of the two applied voltages, and the rotor flux will oppose the stator flux during the other of the two applied voltages. The first times will therefore be less than or greater than the second times depending on the parking position of the rotor 18. The present invention is therefore able to determine the parking position of the rotor 18 during oscillation by monitoring and comparing the average current rise times for the different applied voltages.

Knowledge of the parking position of the rotor 18 is then used by the controller 34 to determine which polarity of drive voltage to apply in order to drive the rotor 18 in a forward direction to re-start the motor 14 from oscillation.

As well as knowing which polarity of voltage to apply, it is also important to know where the rotor 18 is relative to the parking position. The inventors of the present application have further recognised that the above discussed current rise times can be used to determine where the rotor 18 is relative to the parking position.

In particular, by monitoring the plurality of times having the smaller average magnitude, a pattern in peaks of current rise time can be observed. This can be seen in FIG. 8, where the current rise times corresponding to positive applied voltages have a smaller average magnitude, and hence the rotor 18 is determined to be oscillating about a negative parking position.

Due to the asymmetry in flux linkage either side of the parking position, caused by the motor saliency, current rise times of smaller average magnitude, i.e. current rise times corresponding to applied voltages having a polarity opposite to the polarity of the parking position about which the rotor is oscillating, have different peak values which occur at the boundaries of the rotor oscillation, i.e. at points of the oscillation furthest from the parking position. By determining amplitude peaks of current rise time corresponding to applied voltages having a polarity opposite to the polarity of the parking position about which the rotor 18 is oscillating, a direction of motion of the rotor 18 relative to the parking position may be inferred.

Figure 8:
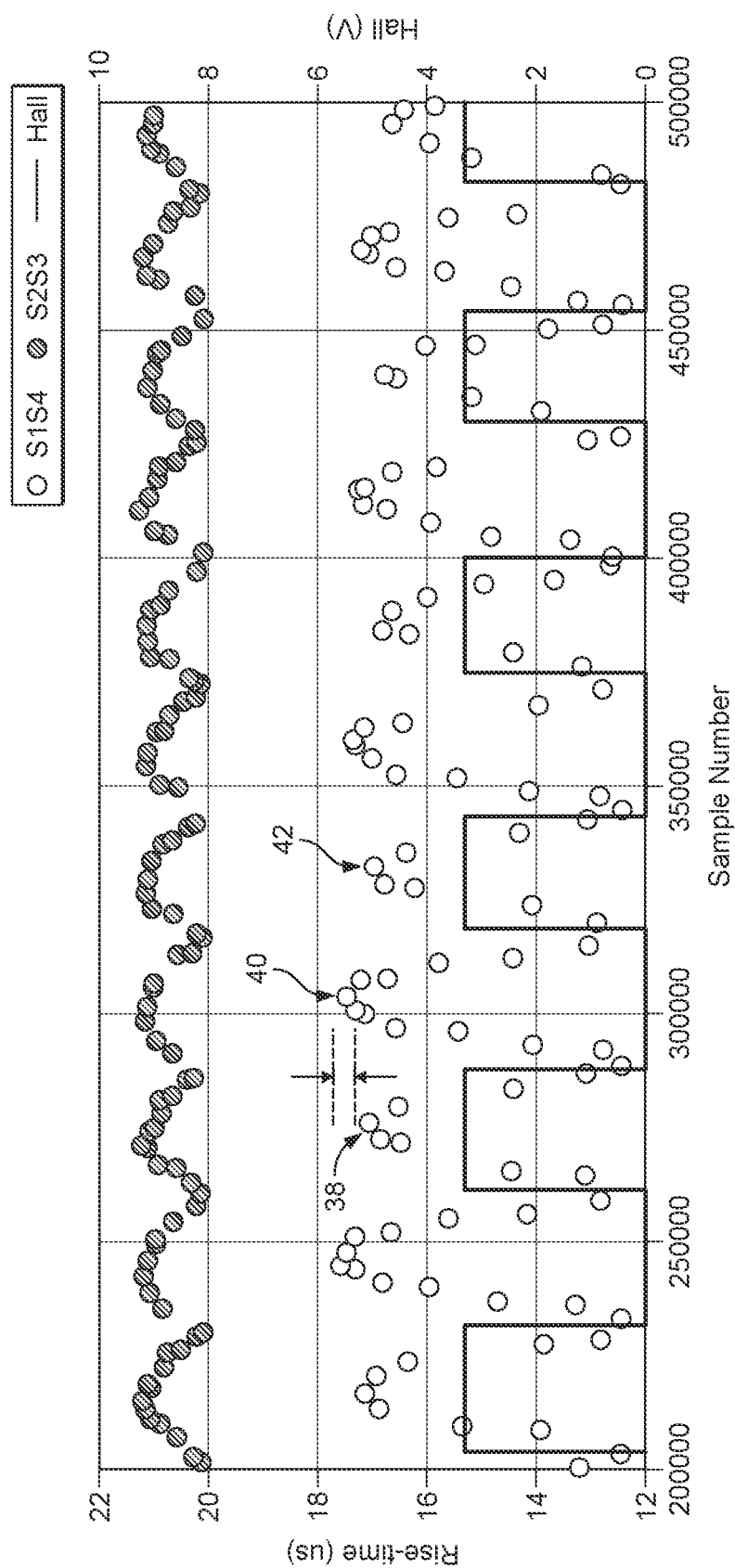
FIG. 8 is a diagram illustrating current rise times in response to the applied voltages of FIG. 7.

Looking at FIG. 8, we can see that there are both high amplitude peaks and low amplitude peaks for the current rise times corresponding to positive applied voltages (labelled S1S4 in FIG. 8). The current rise times vary depending on the position of the rotor 18 relative to the parking position at the time at which the positive voltage is applied to the phase winding 22, in view of the asymmetry in flux linkage about the parking position caused by the saliency imparted by the asymmetric stator tooth design. A high amplitude peak in current rise time occurs when the rotor 18 is at a boundary of oscillation corresponding to a forward direction of the rotor, whilst a low amplitude peak in current rise time occurs when the rotor 18 is at a boundary of oscillation corresponding to a backward direction of the rotor 18.

Thus it can be inferred that the rotor 18 is moving in a forward direction when the current rise time varies from a low amplitude peak to a high amplitude peak. With this knowledge, it is possible to infer from the current rise times the position of the rotor 18 relative to the parking position.

To determine when to apply a drive voltage to the phase winding 22, the controller 34 calculates the time between a low amplitude peak, for example the peak labelled 38 in FIG. 8, and a high amplitude peak, for example the peak labelled 40 in FIG. 8, of the rise times having the smaller average magnitude, with this time corresponding to a time window in which a drive voltage can be applied to the phase winding 22 to drive the rotor 18 in a forward direction out of oscillation. Although described here as utilising the time between a low amplitude peak and a high amplitude peak to calculate the time window, it will be appreciated that other combinations of peaks, for example the time between two low amplitude peaks or the time between two high amplitude peaks, may also be used to calculate the necessary time window.

Once the time window is known, the controller 34 waits for a next determined low amplitude peak, for example the peak labelled 42 in FIG. 8, and sets a timer corresponding to the time window. The controller 34 sets the relevant switches, S2 and S3 in the case of FIG. 8 in view of the determined negative parking position, to apply the drive voltage at a time that is halfway through the time window, with such a time corresponding to the time during the oscillation of the rotor 18 at which the rotor 18 is at the parking position.

In the manner described above, the controller 34 determines the parking position about which the rotor 18 is oscillating, determines the correct polarity of drive voltage to be applied to the phase winding 22 to drive the rotor 18 in a forward direction out of oscillation, determines a relative position of the rotor 18 to the parking position, and calculates a time window during which the drive voltage can be applied to drive the rotor 18 in a forward direction out of oscillation.

Figure 9:
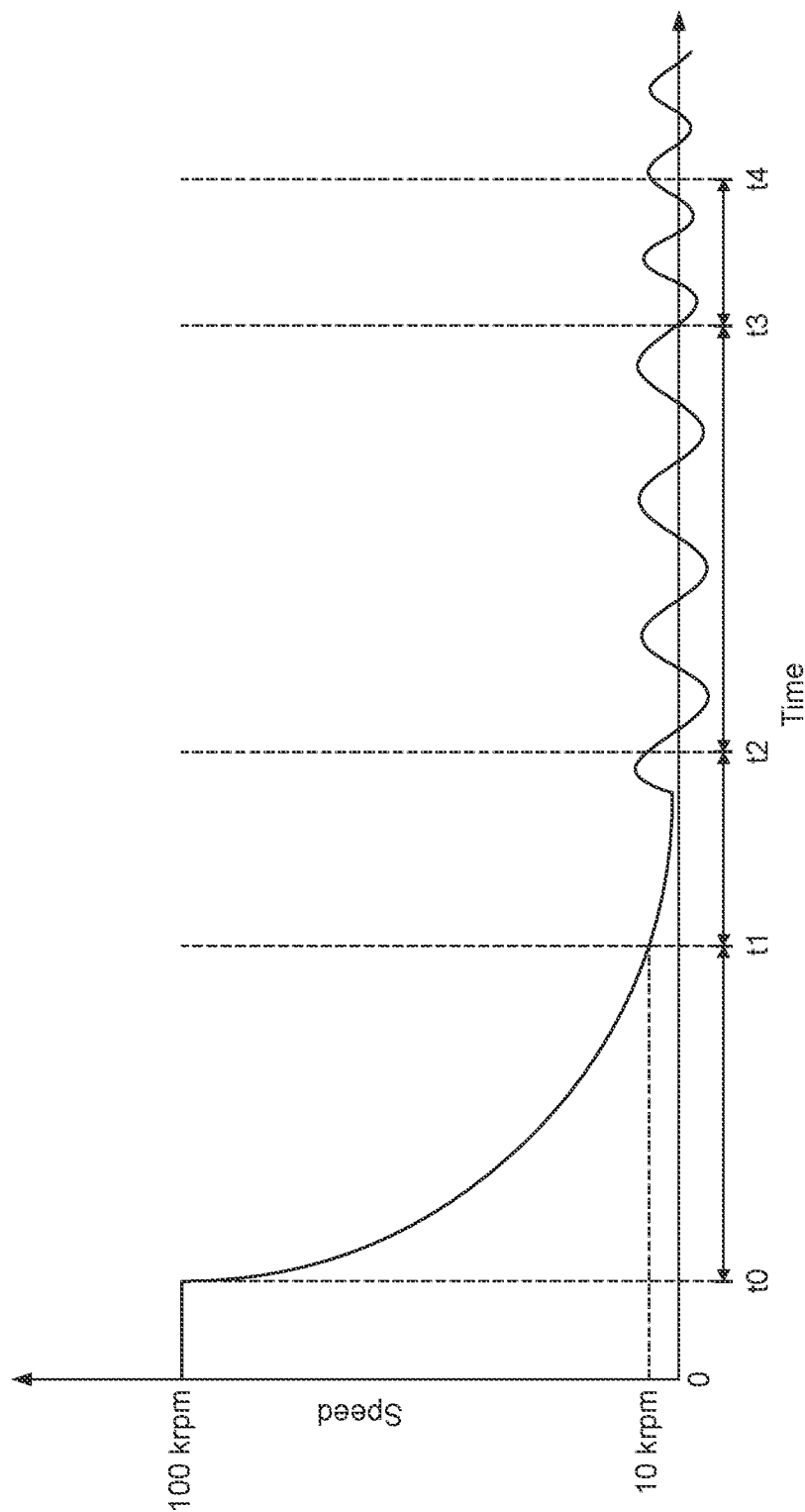
FIG. 9 is a graph illustrating a shutdown sequence of the motor system of FIGS. 1 and 2 according to the present invention.

The present invention thereby enables the motor 14 to be safely re-started during oscillation. A modified shutdown sequence in accordance with the present invention is illustrated in FIG. 9.

Before time t0, the motor is operating in steady-state mode at a speed of around 100 krpm. The shutdown sequence is initiated at time t0, and between time t0 and t1 active braking is applied to the motor, for example by applying appropriate voltages to selected ones of switches Q1-Q4. This causes the motor to decelerate. During the time period t041, the position of the rotor 18 can be monitored. In particular, the signal bEMF from the voltage sensor 33 is periodically monitored by turning switches Q1-Q4 off, and when the voltage transitions from negative to positive or positive to negative a phase voltage zero-crossing is deemed to occur. This allows the motor 14 to be re-started, if needed, during the time period t041. The time period t0-t1 may be around 150-300 ms.

At time t1 the speed of the rotor 18 has dropped to around 10 krpm. Between time t1 and t2, the rotor 18 begins to oscillate about a parking position of the rotor 18. During the time period t1-t2, any possible restart of the motor 14 is delayed due to entry into oscillation, but the period of time for t1-t2 is relatively small, typically in the region of 50 ms and may be minimised by braking, for example by applying appropriate voltages to selected ones of switches Q1-Q4. Between time t2 and t3, the rotor 18 oscillates about the parking position, and the controller 34 is able to determine safe re-start conditions in the manner described above. The time period of t2-t3 is typically in the region of 2 s.

It will be appreciated that the methods described above are dependent on being able to distinguish between peaks in rise times. The ability to use the methods may therefore be limited by resolutions of sensors, for example limited by measurement of voltage from the shunt current, and timers. A practical limit may be, for example, accurately distinguishing between amplitude peaks in rise time where the difference between amplitude peaks is 0.4 µs or more. When the oscillations of the rotor 18 are small, but not small enough to enable safe re-start, it may not be possible to distinguish between amplitude peaks in current rise time, and hence it may not be possible to re-start the motor 14 until the oscillations are small enough to enable safe re-start. This period is indicated by the period t3-t4 in FIG. 9, and is typically less than 200 ms. After time t4, the oscillations are considered small enough that the motor 14 can be safely restarted in the forward direction.

As will be appreciated, by utilising the methods according to the present invention safe re-start of the motor 14 in a forward direction may be enabled over a greater time period during shut-down than for previous motors known in the art. This may reduce the risk of there being a delay in re-start when requested by a user, which may enhance user experience.

Whilst the method described above determines the parking position about which the rotor 18 is oscillating using current rise times in response to applied voltages during oscillation, it will be appreciated that there may be other methods of determining rotor parking position that can be utilised along with utilising current rise times to determine the relative position of the rotor 18 to the parking position. For example, it may be possible to monitor back EMF induced in the phase winding 22 during oscillation and use the back EMF to determine the parking position of the rotor.

Figure 10:
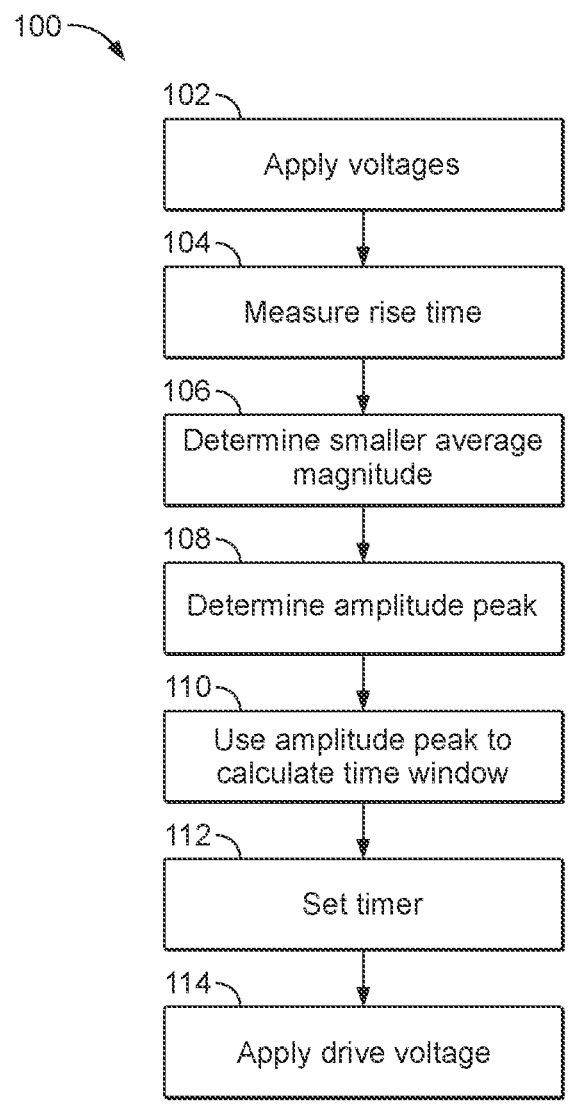
FIG. 10 is a flow diagram illustrating a first method according to the present invention.

A first method 100 of controlling the motor 14 in accordance with the present invention is shown in the flow diagram of FIG. 10.

The method 100 comprises applying 102 voltages of first and second opposing polarities to the phase winding 22 when the rotor 18 is oscillating about a parking position. The method 100 comprises measuring 104 a plurality of first times, each first time comprising a time taken for current flowing through the phase winding 22 in response to an applied voltage of the first polarity to exceed a threshold and a plurality of second times, each second time comprising a time taken for current flowing through the phase winding 22 in response to an applied voltage of the second polarity to exceed the threshold.

The method 100 comprises determining 106 which of an average magnitude of the plurality of first times and an average magnitude of the plurality of second times has the smaller average magnitude, and determining 108 an amplitude peak of the plurality of times having the smaller average magnitude. The method 100 comprises using 110 the amplitude peak to calculate a time window, setting 112 a timer corresponding to the time window at a subsequent determined amplitude peak; and applying 114 a drive voltage to the phase winding during the time window.

By determining amplitude peaks of current rise time corresponding to applied voltages having a polarity opposite to the polarity of the parking position about which the rotor 18 is oscillating, a direction of motion of the rotor 18 relative to the parking position may be inferred, and by using the amplitude peaks a time window can be calculated within which it is considered that an applied drive voltage will drive the rotor 18 in a forward, rather than a backward, direction.

By inferring the direction of the rotor 18 in such a manner and determining when an applied voltage will drive the rotor 18 in a forward, rather than a backward, direction, the motor 14 may be re-started during oscillation, which may reduce a delay of re-start compared to, for example, a motor where it is required to wait until the rotor is considered to be stationary for re-start to occur.

Figure 11:
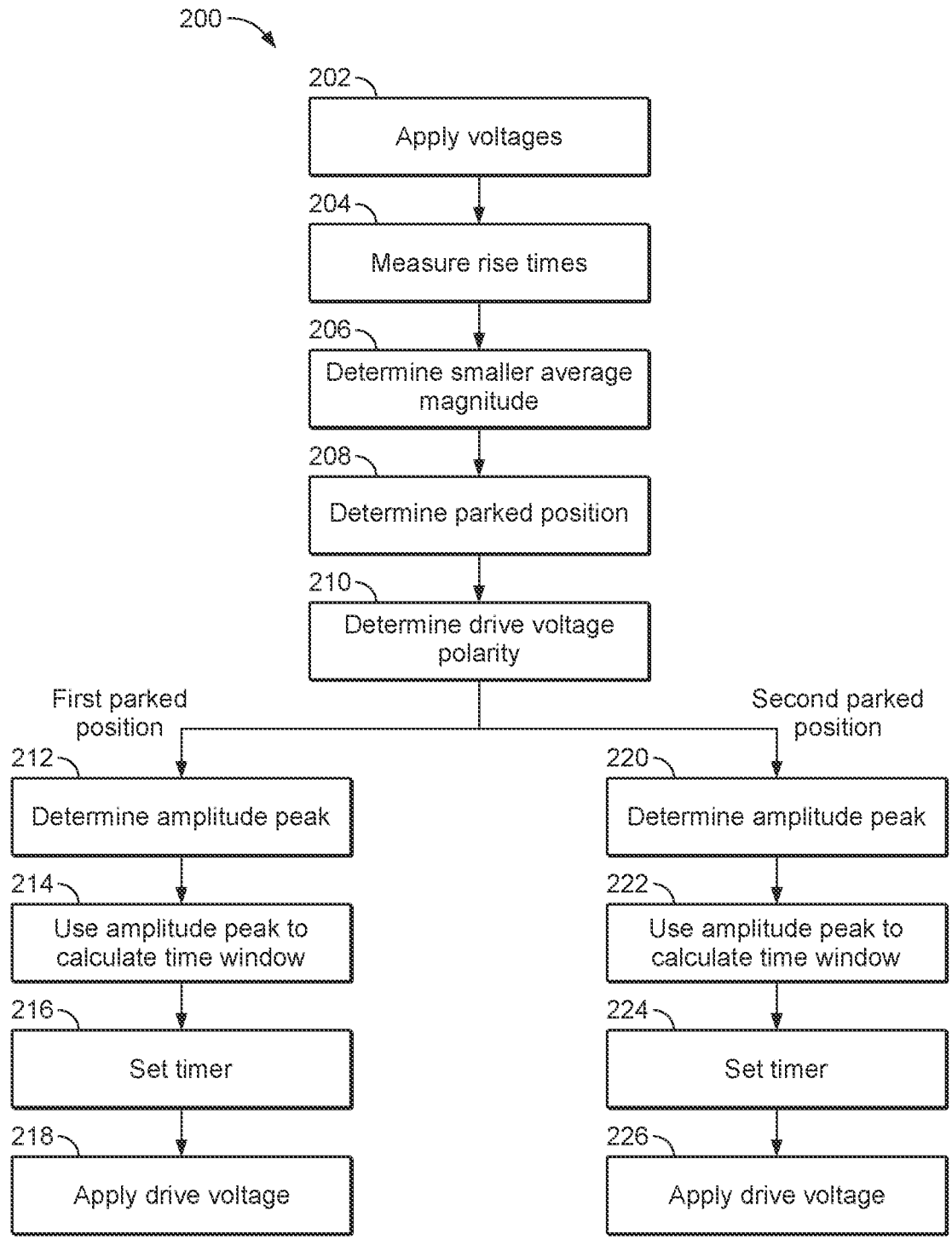
FIG. 11 is a flow diagram illustrating a second method according to the present invention

A second method 200 of controlling the motor 14 in accordance with the present invention is shown in the flow diagram of FIG. 11. The method 200 of FIG. 11 comprises similar steps to the method 100 of FIG. 10, but also includes steps to determine which of two parking positions the rotor 18 is oscillating about.

The method 200 comprises applying 202 voltages of first and second opposing polarities to the phase winding when the rotor 18 is oscillating about a parking position. The method 200 comprises measuring 204 a plurality of first times, each first time comprising a time taken for current flowing through the phase winding 22 in response to an applied voltage of the first polarity to exceed a threshold, and a plurality of second times, each second time comprising a time taken for current flowing through the phase winding 22 in response to an applied voltage of the second polarity to exceed the threshold. The method 200 comprises determining 206 which of an average magnitude of the plurality of first times and an average magnitude of the plurality of second times has the smaller average magnitude.

The method 200 comprises determining 208 that the rotor is oscillating about a first parking position where the average magnitude of the plurality of first times is greater than the average magnitude of the plurality of second times, or a second parking position where the average magnitude of the plurality of second times is greater than the average magnitude of the plurality of first times. The method 200 comprises determining 210 a voltage polarity of a drive voltage to be applied to the phase winding 22 based on the determined first or second parking position.

Where the rotor 18 is oscillating about the first parking position, the method 200 comprises determining 212 an amplitude peak of the plurality of second times, and using 214 the amplitude peak of the plurality of second times to calculate a time window. The method 200 comprises setting 216 a timer corresponding to the time window at a next determined amplitude peak, and applying 218 a determined polarity drive voltage to the phase winding 22 during the time window.

Where the rotor 18 is oscillating about the second parking position, the method 200 comprises determining 220 an amplitude peak of the plurality of first times and using 222 the amplitude peak of the plurality of first times to calculate a time window. The method 200 comprises setting 224 a timer corresponding to the time window at a next determined amplitude peak, and applying 226 a drive voltage having the determined polarity to the phase winding 22 during the time window.

The method 200 allows determination of the parking position about which the rotor 18 is oscillating by monitoring and comparing the average current rise times for the different applied voltages. Knowledge of the parking position about which the rotor 18 is oscillating may enable determination of the correct polarity of drive voltage to apply to the phase winding 22 to drive the rotor 18 in a forward direction. Then, by determining amplitude peaks of current rise time corresponding to applied voltages having a polarity opposite to the polarity of the parking position about which the rotor 18 is oscillating, a direction of motion of the rotor 18 relative to the parking position may be inferred, and by using the amplitude peaks a time window can be calculated within which it is considered that an applied drive voltage will drive the rotor 18 in a forward, rather than a backward, direction.

By inferring the direction of the rotor 18 in such a manner and determining when an applied voltage will drive the rotor in a forward, rather than a backward, direction, the motor 14 may be re-started during oscillation, which may reduce a delay of re-start compared to, for example, a motor where it is required to wait until the rotor is considered to be stationary for re-start to occur.

Figure 12:
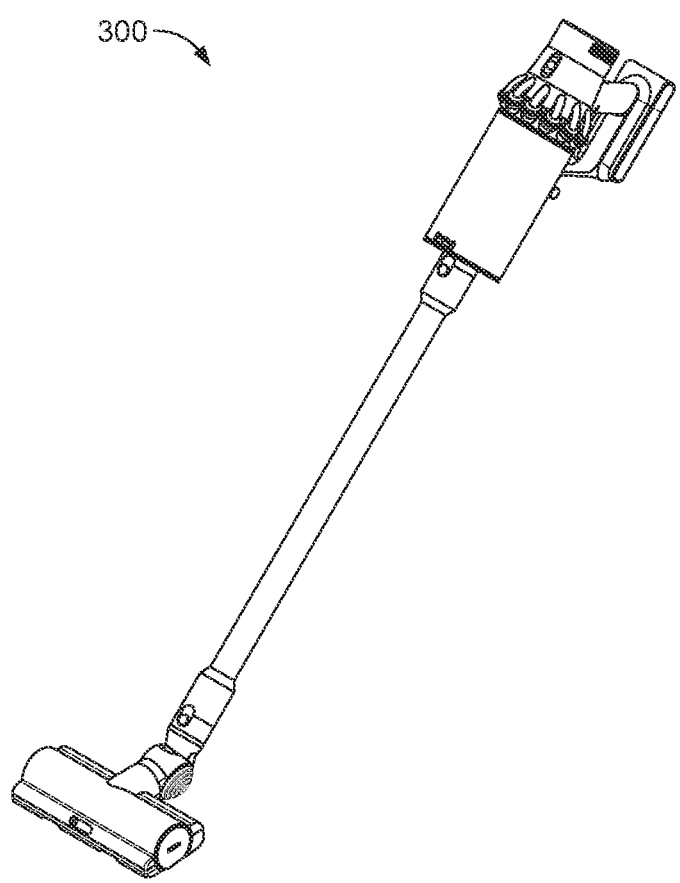
FIG. 12 is a schematic illustration of a floorcare device in accordance with the present disclosure.
Figure 13:
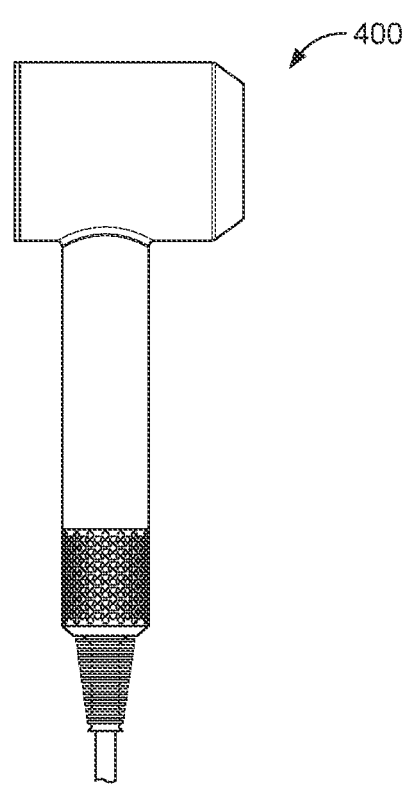
FIG. 13 is a schematic illustration of a haircare appliance in accordance with the present disclosure.

A vacuum cleaner 300 incorporating the motor system 10 according to the present invention is illustrated schematically in FIG. 12, whilst a haircare appliance 400 incorporating the motor system 10 according to the present invention is illustrated schematically in FIG. 13.

The invention claimed is:

1. A method of controlling a brushless permanent-magnet motor having a phase winding and a rotor, the method comprising:
    applying voltages of first and second opposing polarities to the phase winding when the rotor is oscillating about a parking position;
    measuring a plurality of first times, each first time comprising a time taken for current flowing through the phase winding in response to an applied voltage of the first polarity to exceed a threshold;
    measuring a plurality of second times, each second time comprising a time taken for current flowing through the phase winding in response to an applied voltage of the second polarity to exceed the threshold;
    determining which of an average magnitude of the plurality of first times and an average magnitude of the plurality of second times has the smaller average magnitude;
    determining an amplitude peak of the plurality of times having the smaller average magnitude;
    using the amplitude peak to calculate a time window;
    setting a timer corresponding to the time window at a subsequent determined amplitude peak; and
    applying a drive voltage to the phase winding during the time window.

2. The method as claimed in claim 1, wherein the method comprises determining a low amplitude peak of the plurality of times having the smaller average magnitude, and using the low amplitude peak to calculate the time window.

3. The method as claimed in claim 1, wherein the method comprises determining a high amplitude peak of the plurality of times having the smaller average magnitude, and using the high amplitude peak to calculate the time window.

4. The method as claimed in claim 1, wherein the method comprises determining a consecutive low amplitude peak and high amplitude peak of the plurality of times having the smaller average magnitude, and using a time difference between the low amplitude peak and the high amplitude peak to calculate the time window.

5. The method as claimed in claim 1, wherein the drive voltage is applied to the phase winding at a halfway point of the time window.

6. The method as claimed in claim 1, wherein the method comprises removing the first or second polarity voltage from the phase winding in response to current flowing through the phase winding exceeding the threshold, and waiting for the current flowing through the phase winding to reach zero before applying a next second or first polarity voltage to the phase winding.

7. The method as claimed in claim 1, wherein the method comprises actively bringing to the current flowing through the phase winding to zero when the current flowing through the phase winding exceeds the threshold.

8. The method as claimed in claim 1, wherein the method comprises determining that the rotor is oscillating about a first parking position where the average magnitude of the plurality of first times is greater than the average magnitude of the plurality of second times, or a second parking position different to the first parking position where the average magnitude of the plurality of second times is greater than the average magnitude of the plurality of first times.

9. The method as claimed in claim 8, wherein the method comprises determining a voltage polarity of the drive voltage applied to the phase winding based on the determined first or second parking position.

10. The method as claimed in claim 1, wherein the drive voltage applied to the phase winding during the time window comprises a polarity corresponding to the polarity of the voltage applied during the plurality of time periods having the larger average magnitude.

11. A brushless permanent-magnet motor comprising a stator, a phase winding wound about the stator, a rotor rotatable relative to the stator, and a control system to perform the method as claimed in claim 1.

12. The brushless permanent-magnet motor as claimed in claim 11, wherein the control system comprises an inverter, a gate driver module, a controller, and a current sensor, the inverter coupled to the phase winding, the gate driver module to drive opening and closing of switches of the inverter in response to control signals output by the controller, and the current sensor to output a signal that provides a measure of the current in the phase winding.

13. A] floorcare device comprising the brushless permanent-magnet motor as claimed in claim 11.

14. A haircare appliance comprising the brushless permanent-magnet motor as claimed in claim 11.

* * * * *